Figure 23:
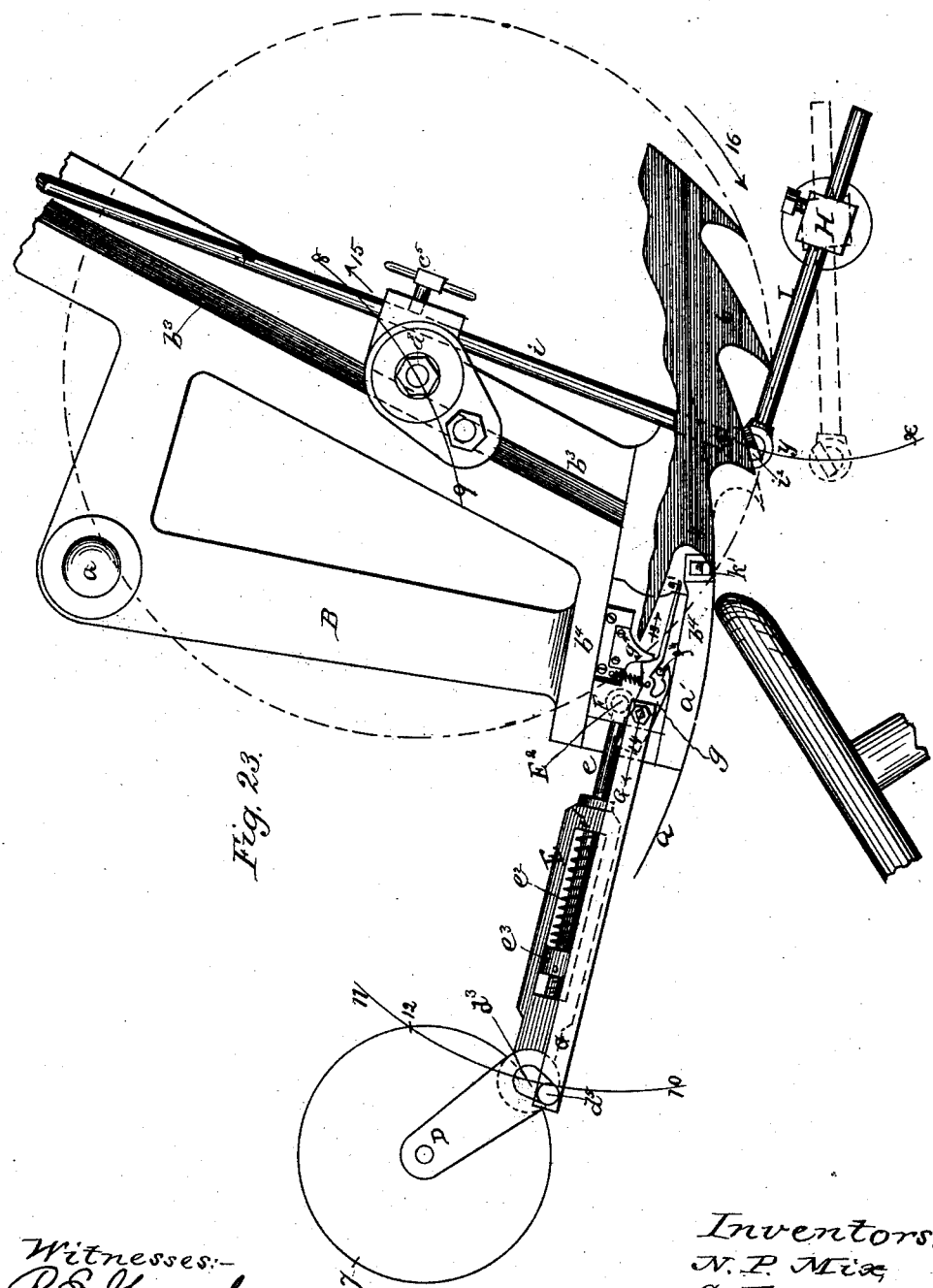

(No Model.) 9 Sheets—Sheet 1.
N. P. MIX & C. F. MARVIN.
MACHINE FOR SHARPENING CIRCULAR SAWS.
No. 364,185. Patented May 31, 1887.
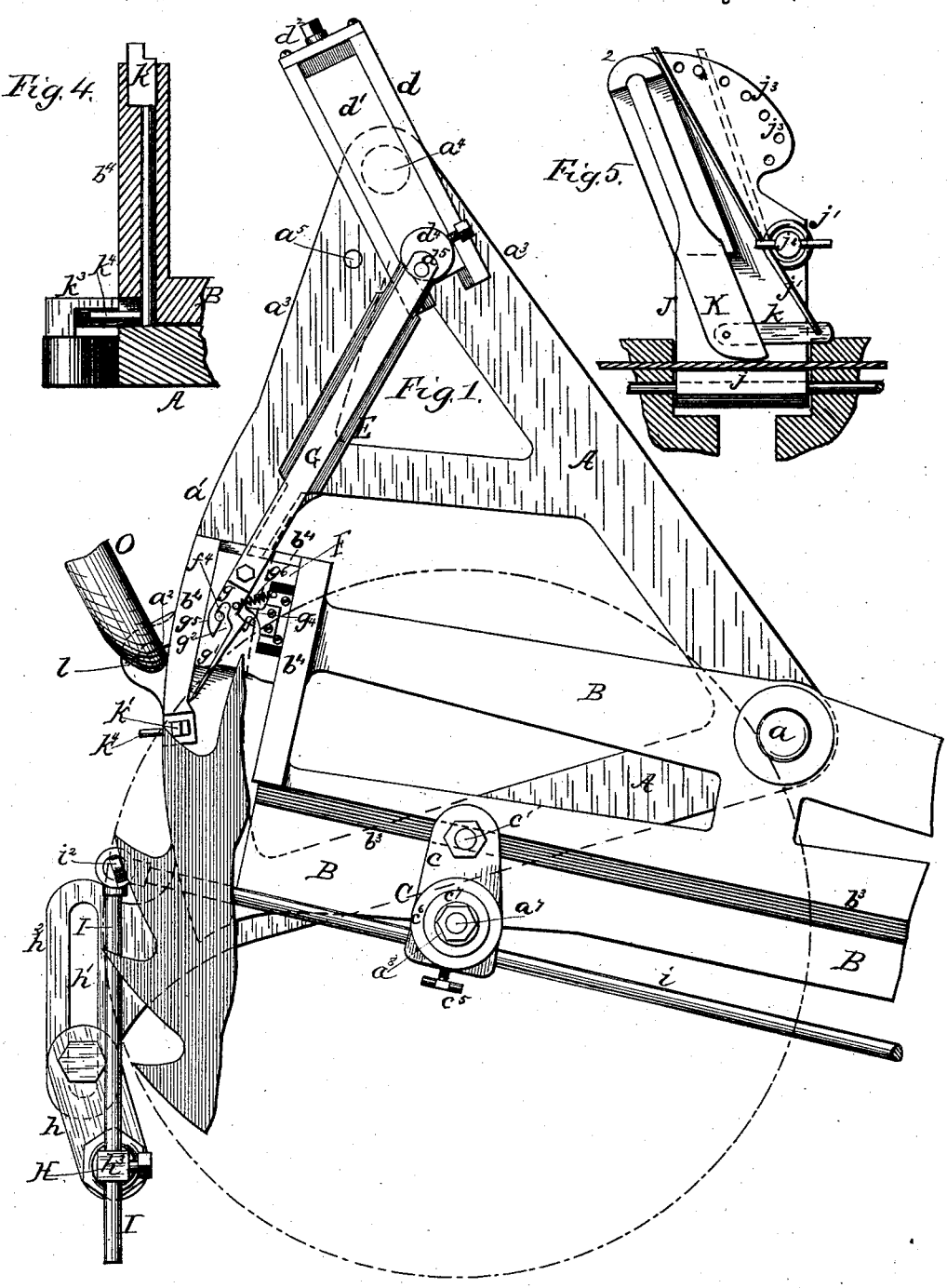
Witnesses:
R. E. Grant
G. E. Tucker
Inventors:
N. P. Mix,
C. F. Marvin,
by Johnson and Johnson
Attys.

(No Model.) 9 Sheets—Sheet 2.
N. P. MIX & C. F. MARVIN.
MACHINE FOR SHARPENING CIRCULAR SAWS.
No. 364,185. Patented May 31, 1887.
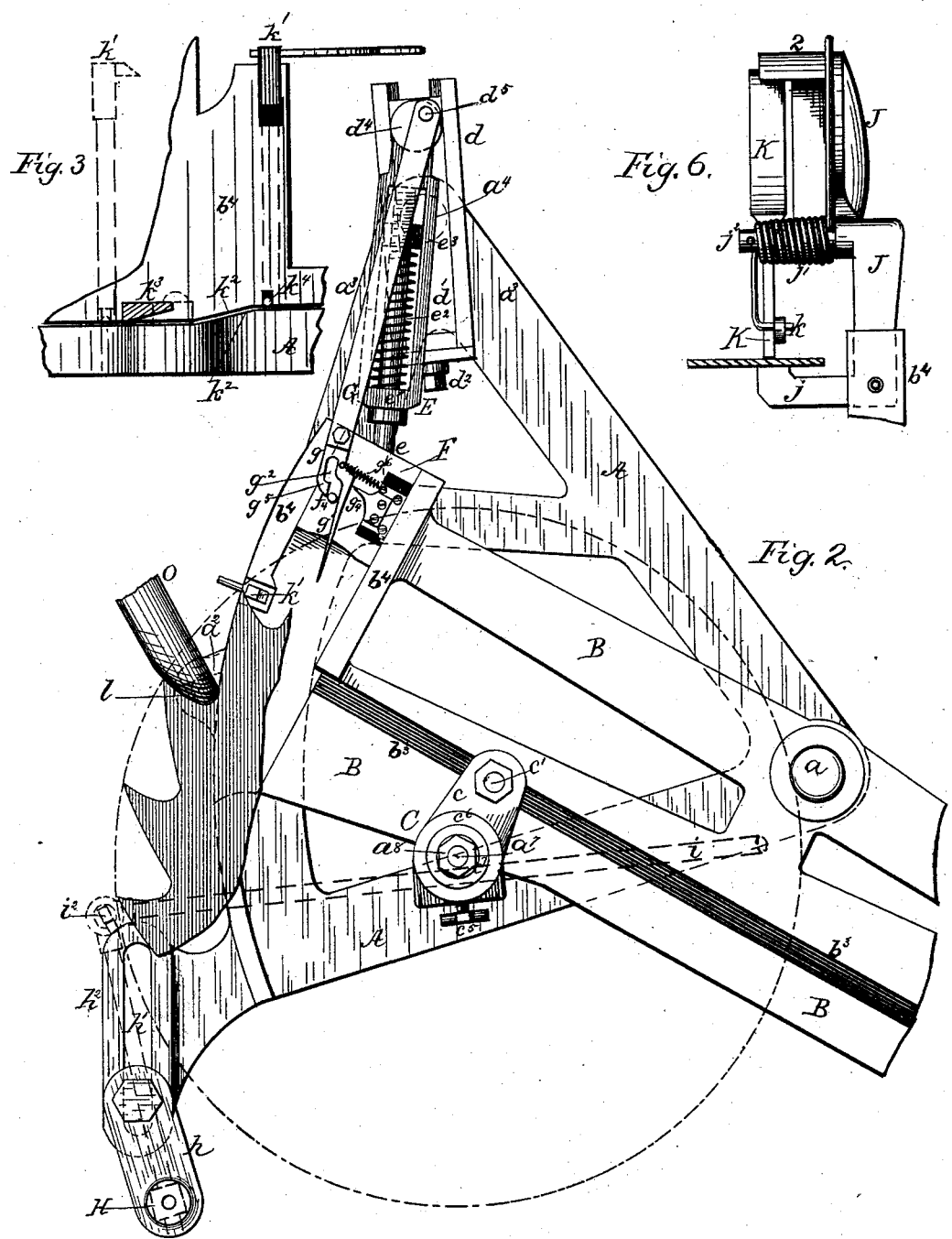

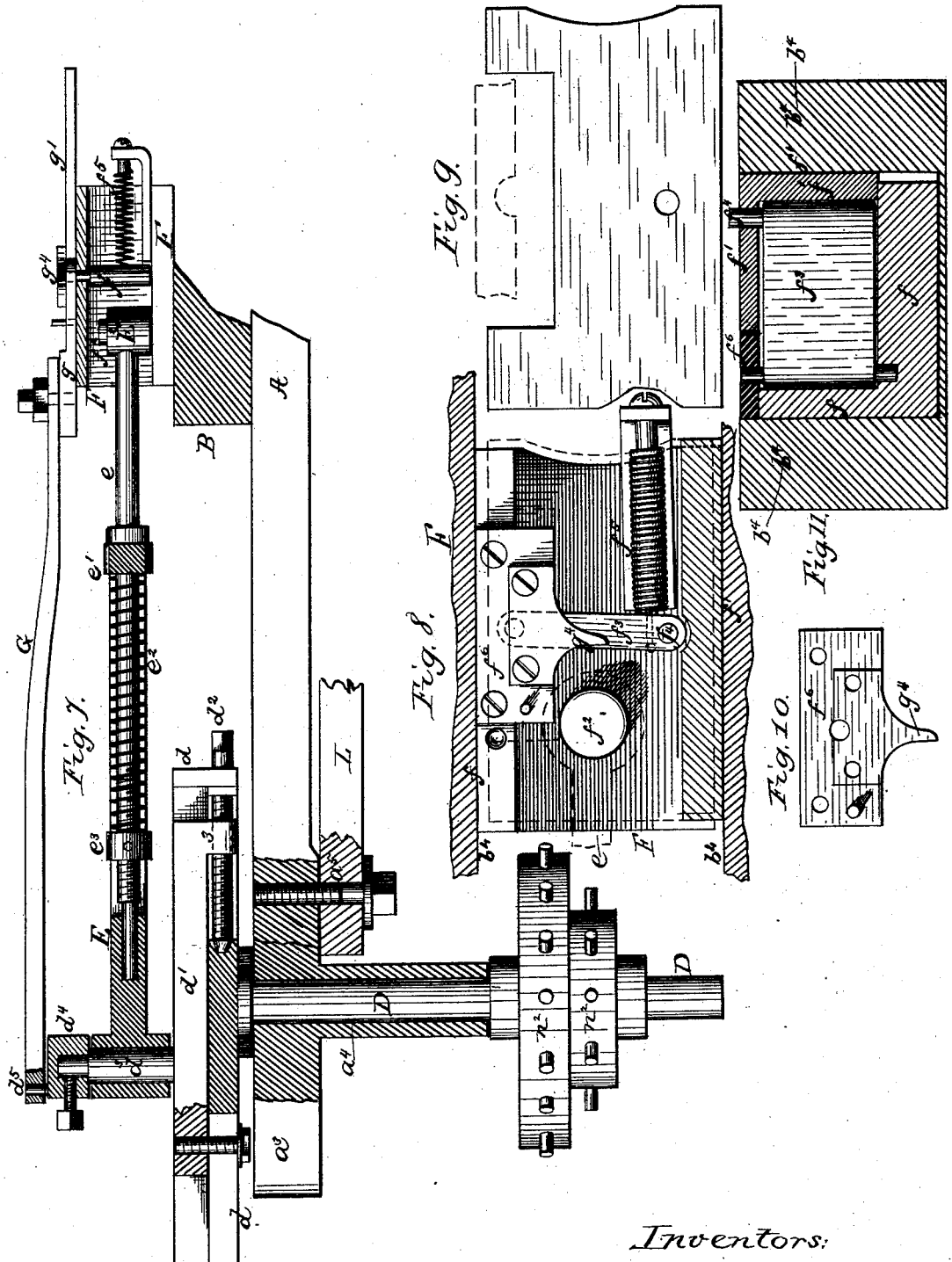

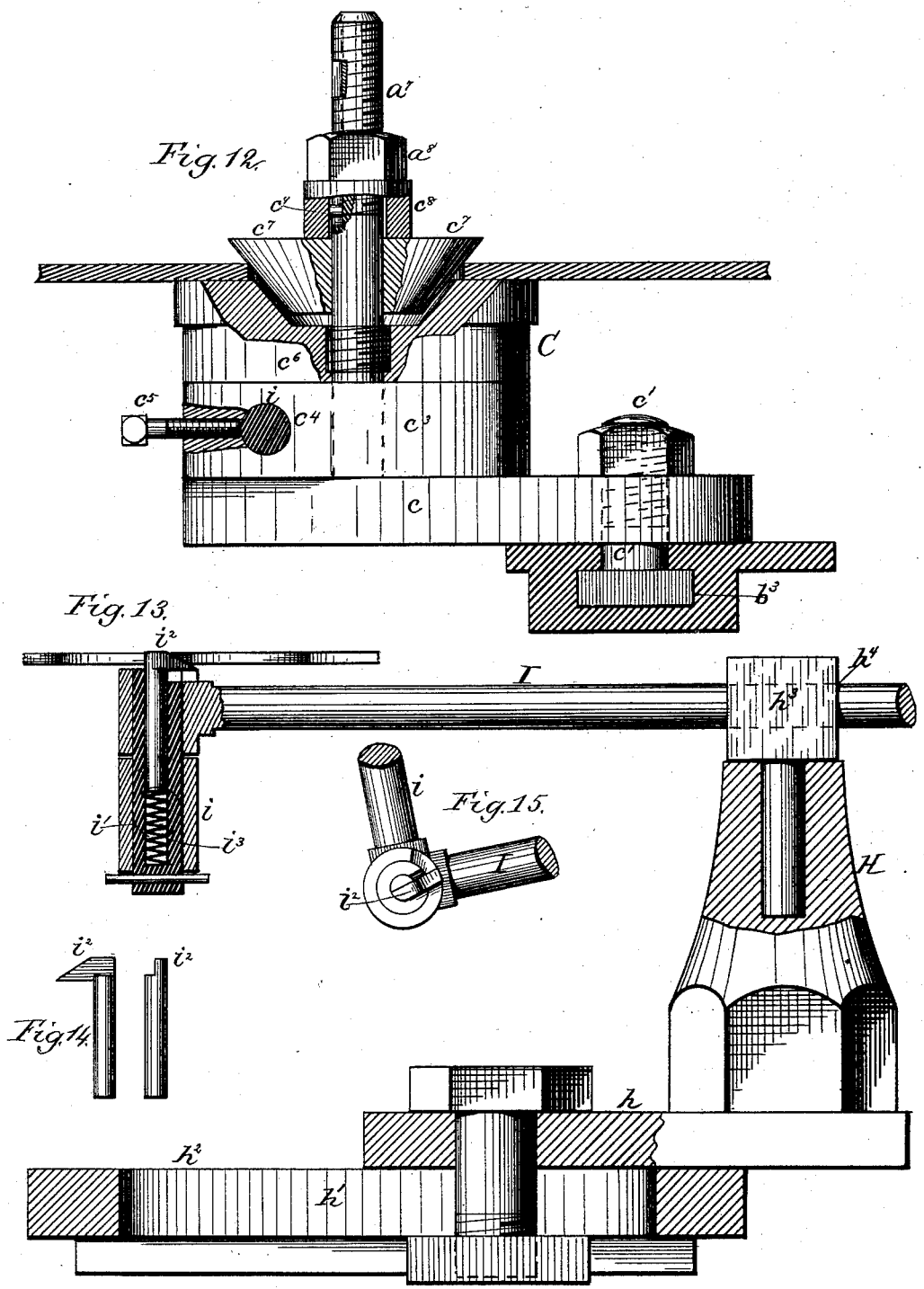

(No Model.) 9 Sheets—Sheet 5.
N. P. MIX & C. F. MARVIN.
MACHINE FOR SHARPENING CIRCULAR SAWS.
No. 364,185. Patented May 31, 1887.
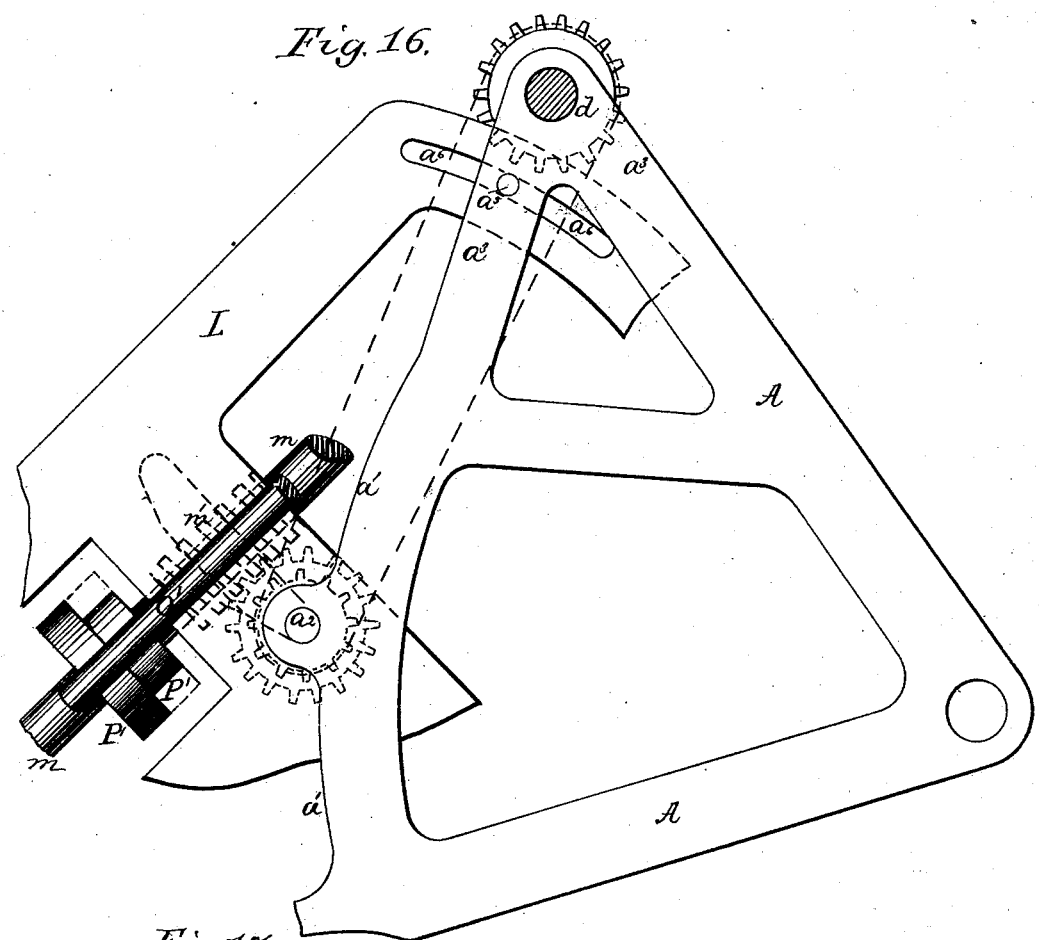
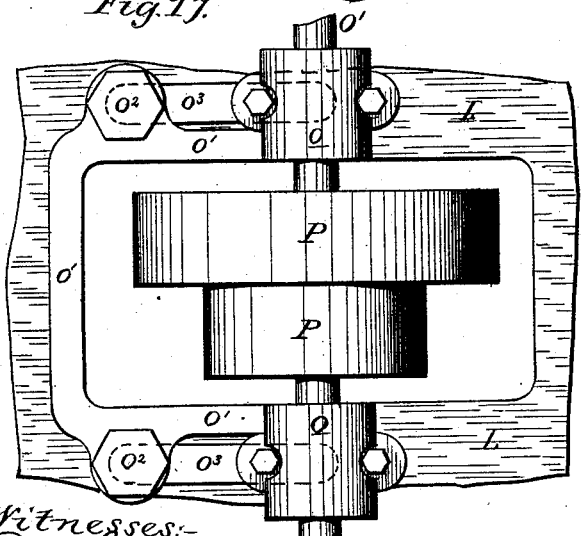
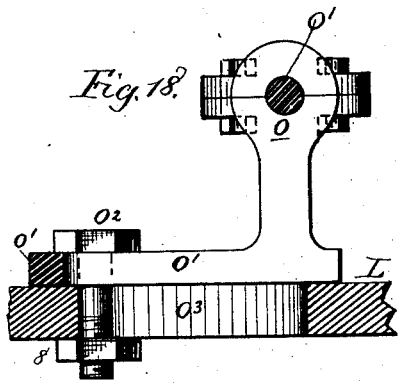
Witnesses:
R. E. Grant
G. E. Tucker
Inventors:
N. P. Mix,
C. F. Marvin
by Johnson and Johnson
Attys.

(No Model.) 9 Sheets—Sheet 6.
N. P. MIX & C. F. MARVIN.
MACHINE FOR SHARPENING CIRCULAR SAWS.
No. 364,185. Patented May 31, 1887.
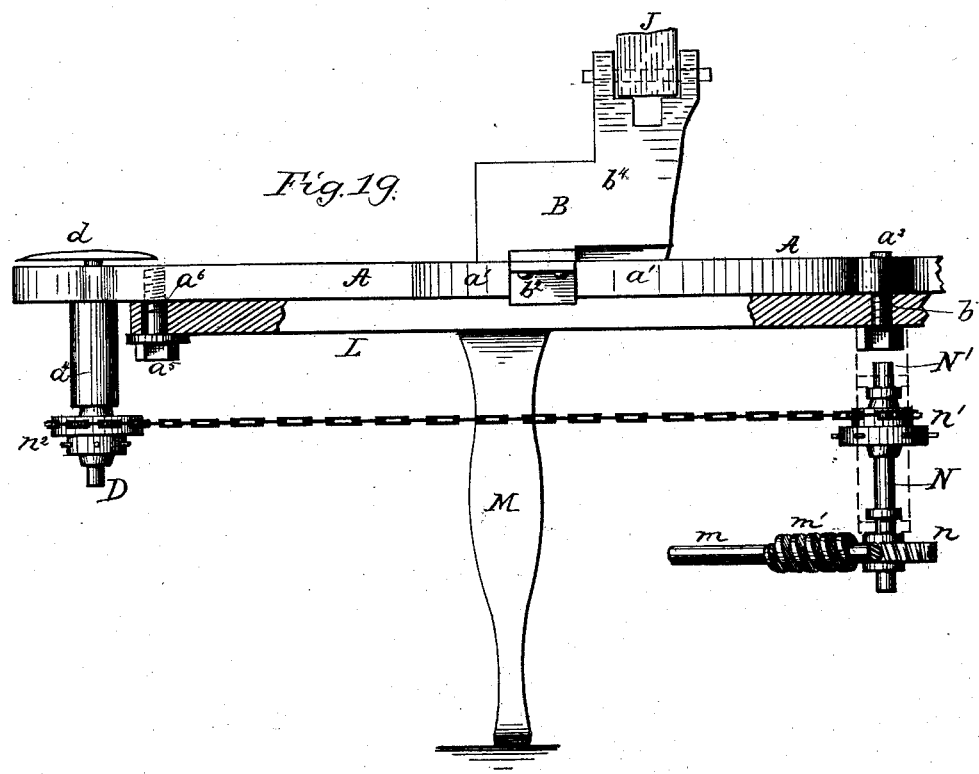
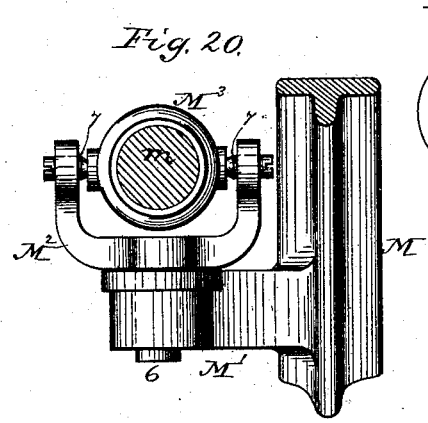
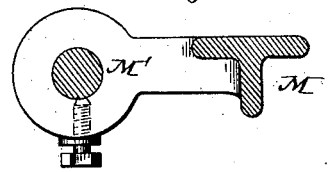
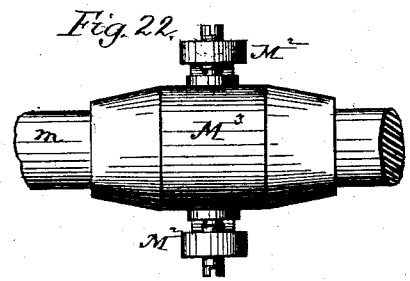
Witnesses:-
R. O. Grant
G. E. Tucker
Inventors:
N. P. Mix,
C. F. Marvin
by Johnson and Johnson
Attys.

(No Model.) 9 Sheets—Sheet 7.
N. P. MIX & C. F. MARVIN.
MACHINE FOR SHARPENING CIRCULAR SAWS.

No. 364,185. Patented May 31, 1887.

Witnesses:—
R. E. Grant
G. E. Tucker

Inventors:
N. P. Mix,
C. F. Marvin
by Johnson and Johnson
Attys.

(No Model.) 9 Sheets—Sheet 8.
N. P. MIX & C. F. MARVIN.
MACHINE FOR SHARPENING CIRCULAR SAWS.
No. 364,185. Patented May 31, 1887.

Witnesses:
Ella S. Johnson.
W. R. Mackrille.

Inventor:
Newell P. Mix
Charles F. Marvin
By Johnson & Johnson
Attorneys (No Model.)
N. P. MIX & C. F. MARVIN.
MACHINE FOR SHARPENING CIRCULAR SAWS.
No. 364,185. Patented May 31, 1887.
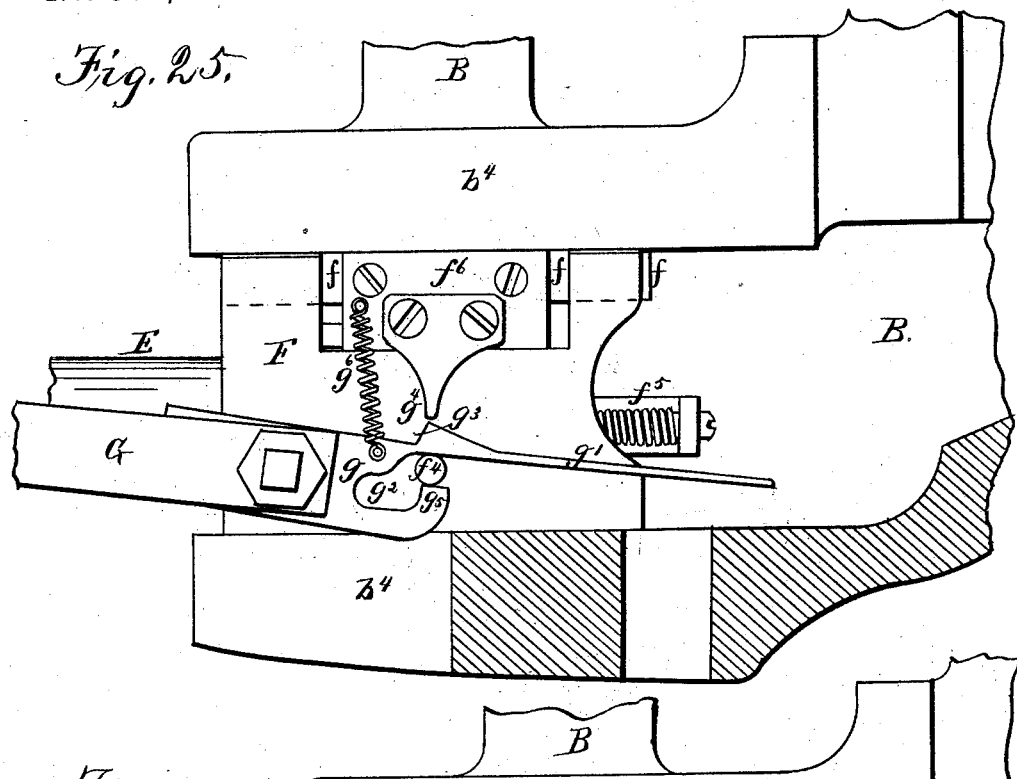
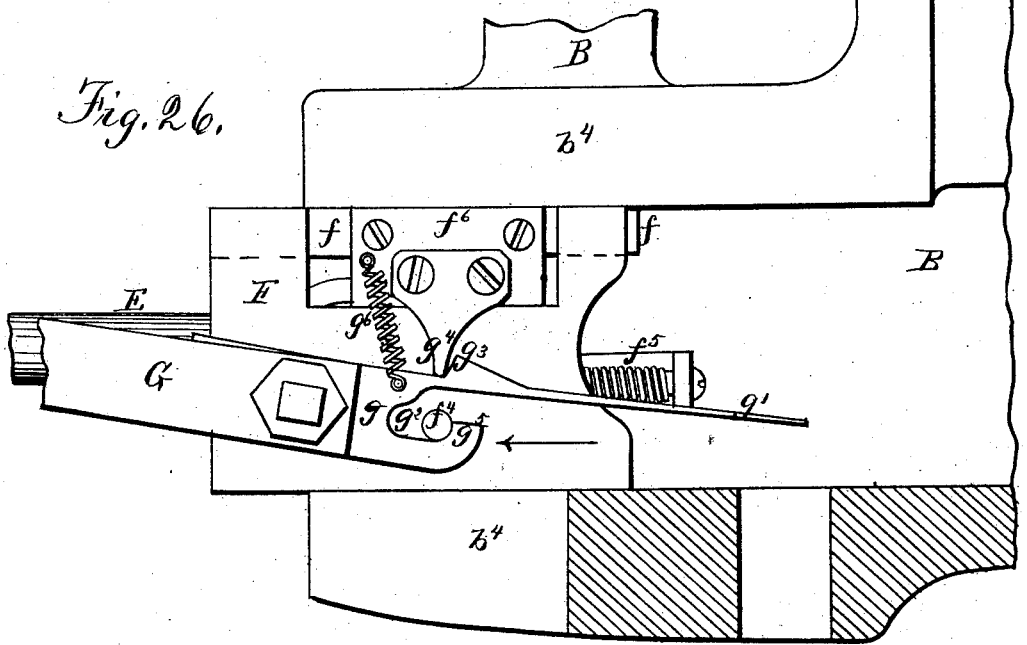

UNITED STATES PATENT OFFICE.

NEWELL P. MIX, OF AVENUE, AND CHARLES FREDERICK MARVIN, OF COLUMBUS, OHIO; SAID MARVIN ASSIGNOR TO SAID NEWELL P. MIX.

MACHINE FOR SHARPENING CIRCULAR SAWS.

SPECIFICATION forming part of Letters Patent No. 364,185, dated May 31, 1887.

Application filed June 9, 1885. Serial No. 168,117. (No model.)

*To all whom it may concern:*

Be it known that we, NEWELL P. MIX, of Avenue, in the county of Franklin, in the State of Ohio, and CHARLES FREDERICK MARVIN, of Columbus, in said county and State, and both citizens of the United States, have jointly invented certain new and useful Improvements in Sharpeners for Circular Saws, of which the following is a specification.

Our invention relates to circular-saw sharpeners, its objects being, first, to rapidly and efficiently grind the teeth, preserving the correct form of the same, and leaving the points at equal distances from the center; second, to operate equally well upon saws having different-sized teeth and saws of different diameter; and, third, to correct any departure from uniformity that may exist in the teeth.

The general construction of the invention is as follows: To a properly-formed bed-frame is pivoted a vibrating carrier-frame, to which the saw is adjustably attached and moving therewith. The saw is so arranged in relation to the carrier that the back of each tooth while being ground conforms to and moves in the arc of a circle of which the pivot of the saw-carrier is the center. An emery-wheel is so situated in relation to the saw-carrier as to have its edge turning through a determinate point of the arc described by said saw-carrier. The emery-wheel by this construction grinds a uniform curve along the back of each tooth and down into the throat and on the face of the next succeeding tooth. The saw-carrier is vibrated by a pitman, which connects it with a crank, the shaft of which has a bearing in an extension of the bed-frame. When the saw-carrier moves backward, the saw moves with it until the back of one of its teeth strikes against a stop, $i^2$. The continued backward movement of the saw-carrier partially rotates the saw in relation to the carrier only in a forward direction thereon, and brings a second stop, $k'$, fixed to the saw-carrier, against the front of the tooth adjacent to and forward of the tooth bearing against the first stop, $i^2$, leaving the back of the former tooth in the above-described arc of which the pivot of the saw-carrier is the center. This brings the saw-carrier and saw to rest; but the pitman that connects the former to the operating-crank finishes its stroke, being connected to the saw-carrier by a box capable of sliding within guideway-walls thereon, when a considerable resistance is offered to the movement of the saw-carrier. The pitman is then again drawn forward by the crank, moving the saw-carrier and the saw a distance sufficient to grind the succeeding tooth, and the operation is repeated until the saw is finished.

The specific and detailed construction of the various parts is hereinafter fully described with reference to the accompanying drawings.

Figure 24:
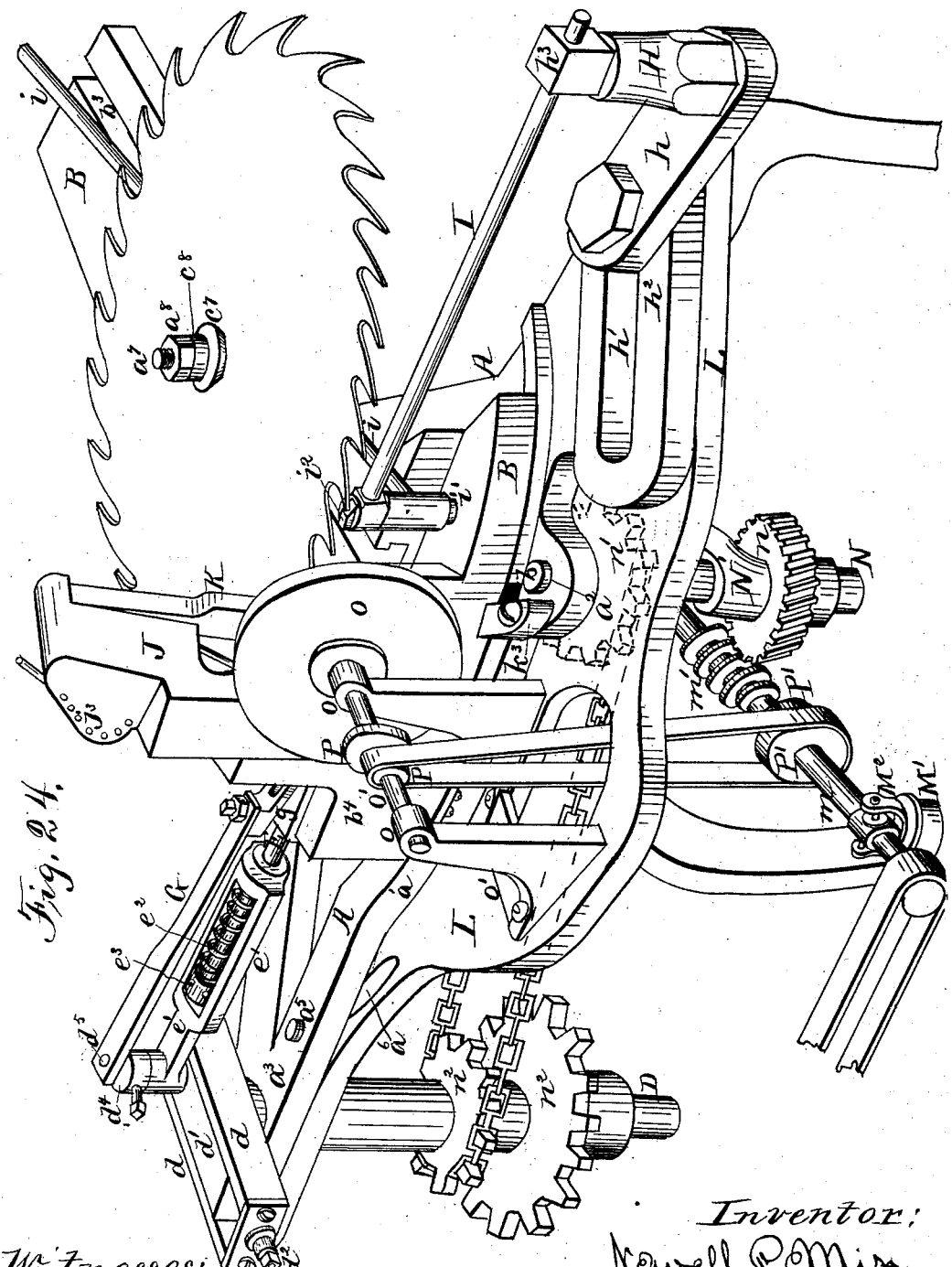

Figure 1 represents a plan view of the machine, showing the relation of the bed-frame, the saw-carrier, and the saw with the front and rear stops, $i^2$ and $k'$, bearing against the two adjacent teeth of the saw to get it in the right position in which it is held by the detent K, Fig. 5. Fig. 2, Sheet 2, represents a plan view, showing the positions of the saw-carrier and its operating connections to bring the pitman at the end of its forward stroke, and the emery-wheel on the face and in the throat of a saw-tooth. Fig. 3, Sheet 2, represents a side view of a part of the saw-carrier, showing the front stop, $k'$, elevated and bearing against a saw-tooth. Fig. 4, Sheet 1, represents a transverse section of the same, showing the form of the front stop. Fig. 5, Sheet 1, represents an inner side view of the detent mechanism which clamps the saw to the carrier and permits it to rotate forward thereon. Fig. 6, Sheet 2, represents a view of the same looking from the pitman connections. Fig. 7, Sheet 3, represents a side view, partly in section, of the pitman, trip-rod, and sectional box, showing their relation to the saw-carrier and bed-frame. Fig. 8, Sheet 3, represents a sectional plan view of the sectional box with the top plate cut away. Fig. 9 is the top plate of the sectional box. Fig. 10 is the plate to which the finger that releases the trip-rod is secured. Fig. 11 is a transverse section of the sectional box. Fig. 12, Sheet 4, represents a side view, partly broken away, of the device on which the saw is centered. Fig. 13 represents a side view, partly broken away, of the rear stop and one of the rods that move it with the support of said rod. Fig. 14 shows the rear stop. Fig. 15 shows in plan the joint made by the moving rods which support the rear stop. Fig. 16, Sheet 5, represents a plan view showing the relations of the bed-frame, the base-plate, the shaft of the emery-wheel, and the counter-shaft. Fig. 17 is a plan of the shaft of the emery-wheel and of its bearings. Fig. 18 is a side view of one of the bearings of the emery-wheel shaft. Fig. 19, Sheet 6, represents a side view, partly in section, showing the relation of the counter-shaft with the base-plate and bed-frame, and the means by which said shaft actuates the different parts of the machine. Fig. 20 is a side view of one bearing of the counter-shaft. Fig. 21 is a plan view of the support of the same, and Fig. 22 is a plan view of said bearing. Fig. 23 represents a view like Figs. 1 and 2, but more particularly illustrating the operation of rotating the saw to bring its teeth up to the emery-wheel, notwithstanding the spaces between the teeth may be of different lengths. Fig. 24 represents in perspective the organized machine. Fig. 25 shows in top view enlarged the sectional box and its pitman and trip-rod connections in the positions they occupy when the trip-rod has been tripped to release the clamping function of the sectional box upon the saw-carrier frame; and Fig. 26 is a similar view showing the parts in the positions they occupy when the sectional box is clamped to the saw-carrier frame.

The stand, Fig. 19, upon which the machine is adjustably attached is provided with a shaft, $m$, which imparts motion by proper mechanism both to the pitman-crank and emery-wheel, as herein fully described.

Reference being had to the accompanying drawings, and to the letters of reference marked thereon, A represents the bed-frame of the machine, having at its inner corner a pin which serves as the pivot $a$ of the saw-carrier. The outer edge, $a'$, of the bed-frame is made on the arc of a circle of which the said pivot $a$ is the center.

$a^2$, Figs. 1, 2, and 16, is a vertical opening made in a projection from the outer edge, $a'$, of the bed-frame on the curved portion $a'$ thereof, and situated vertically below the point through which the edge of the emery-wheel turns. This opening $a^2$ receives a pivot, $b$, Fig. 19, standing from the upper surface of a base-plate, L, fixed on top of a stand which supports the machine, and upon this pivot $b$ the bed-frame A and attached machine may be turned, and is adjustable to different positions, as is hereinafter explained.

$a^3$, Figs. 1 and 2, is a horizontal projection from the bed-frame A to support the pitman crank-shaft. Near the end of this projection is a vertical opening, $a^4$, Fig. 7, which forms a bearing for the shaft D, that carries the actuating-crank, and also the sprocket-wheels or pulleys $n^2$ that drive the machine.

$a^5$, Figs. 1, 7, and 16, is a vertical screw-bolt engaging in a threaded opening made in the bed-frame extension $a^3$, near the end thereof, and through a slot, $a^6$, Fig. 16, in the base-plate L, made on the arc of a circle of which the opening $a^2$ is the center, so that the bed-frame A can be partially rotated and adjusted on the base-plate L, which is hereinafter described.

B is the saw-carrier frame, pivoted at $a$ upon the bed-frame A and movable upon said pivot.

$b^2$, Fig. 19, is an angle-gib fitting upon the curved edge $a'$ of the bed-frame A, and holding by its under angle-lip the saw-carrier thereon.

$b^3$, Figs. 1, 2, 12, and 23, is a straight groove running from the curved end of the carrier to the rear of and at one side of the pivot $a$ of the saw-carrier. This groove $b^3$ forms the guideway within which the saw-holding center is clamped, as hereinafter described.

$b^4$ are upward projections from the outer curved end of the saw-carrier above the gib $b^2$, Fig. 19, that keeps the latter on the bed-frame. The said projection has made in it a straight slideway or channel between the walls $b^4$, with vertical walls, in which slideway the box F, to which the actuating-pitman E is attached, is placed, and is capable of a limited degree of motion, as hereinafter explained.

C, Fig. 12, is the saw-holder having the horizontal base-piece $c$, which lies over the groove $b^3$, formed in the pivoted frame B, and is rendered longitudinally adjustable thereon by means of a bolt, $c'$, the square head of which slides in the lower wider part of the groove $b^3$, while the stem $a^7$ of said bolt projects vertically upward, passing through a screw-threaded piece, $c^6$, and has the latter secured to it by a nut, $a^8$. The vertical stem $a^7$ rises from the base-piece $c$ away from the groove $b^3$, and carries the saw-seat $c^6$. By the described construction the saw-holder C, besides being movable longitudinally in the groove $b^3$, can have its base-piece $c$ set and held at different angles thereon to accommodate saws of different diameters, and teeth with backs sloping more or less inward. The saw-holder C has passing through its base part $c^3$, at one side of its center, a straight horizontal opening, $c^4$, through which passes and in which is horizontally adjustable one of the rods $i$ that support the rear stop, $i^2$, for the saw. The said rod $i$ is held in position in the opening $c^4$ by means of the set-screw $c^5$.

$c^6$ is a circular piece or block screwed down on the stem $a^7$ above the piece $c^3$. The upper surface of the piece $c^6$ is hollowed down concentrically around its central opening and receives the lower end of a conical hub, $c^7$, which passes through the eye of the saw, the latter lying upon the upper surface of the piece $c^6$ to secure and center it. The hub $c^7$ is made in the shape of the frustum of a cone and rests with its smaller end downward. The washer $c^8$ fits down on the upper surface of the conical hub $c^7$, and a nut, $a^9$, screws down on the said washer. The washer has upon its circumference a pin, $c^9$, that slides in a vertical groove in the screw-stem and prevents the washer from turning on the latter, whereby the nut is prevented from turning should the hub turn.

D, Fig. 7, is a vertical shaft passing through and having a bearing in the opening $a^4$ of the bed-frame. $d$ is a horizontal arm fixed to the top of the said shaft and having the rectangular block $d'$ slidable in ways thereon.

$d^2$ is a longitudinal screw engaging an internally-threaded opening, 3, on the under part of the block $d'$ and rendering the latter longitudinally adjustable in the arm $d$.

$d^3$ is a vertical stem rising from the upper surface of the block $d'$ and passing through one end of the extensible pitman that actuates the saw-carrier. $d^4$ is a washer fitting upon said stem $d^3$, above the pitman E, and fixed in the desired position thereon by a set-screw, as shown. $d^5$ is an eccentric-pin rising from the upper surface of the washer $d^4$ and passing into an opening in the end of a trip-rod, G, which is reciprocated thereby, as hereinafter explained.

E, Fig. 7, is the extensible pitman that oscillates the saw-carrier, with one end connected with or pivoted upon the stem $d^3$ and the other connected with a sectional box, F, that rests in the slideway between the walls $b^4$ in the carrier B. The pitman E is made extensible by the rod $e$, which forms a part of it, passing into the loop $e'$, and being surrounded by the coil-spring $e^2$. The said spring $e^2$ bears against the loop $e'$ and the nut $e^3$.

F, Figs. 8 and 11, is the sectional box made in two longitudinal L-shaped sections, of which the bottom and one side form one, $f$, and the top and the remaining side the other, $f'$. The end of the rod $e$ of the pitman E is pivoted on a pin, $f^2$, rising from the bottom of the said box. $f^3$ is a transverse rectangular piece situated about centrally in the box F and pivoted at one end to the floor of the section $f$ and to a piece, $f^6$, screwed to the top of its side. The opposite upper corner is formed into or is provided with a vertical pin, $f^4$, which passes through an opening in the top plate of the section $f'$. Thus as the edges of the two sections are free to pass each other when the transverse piece $f^3$ is drawn to a greater angle across the sectional box the sides of the latter approach each other and the box no longer binds in the slideway $b^4$.

$f^5$ is a coiled spring arranged to return the cross-piece $f^3$ and make the box bind in the slideway to clamp by friction the partible box to the walls of its slideway, which latter is integral with the saw-carrier frame.

G is the trip-rod reciprocated by means of the eccentric-pin $d^5$, and arranged above the pitman and nearly in its line of motion. The stem $d^3$ being situated eccentric to the shaft D, both the pitman and trip-rod are moved by a crank, the throw of which is the distance between the centers of the stem $d^3$ and shaft D, and which can be lengthend or shortened by means of the screw $d^2$ in the stem-carrying block. The end of the trip-rod G adjacent to the saw-carrier has bolted upon it a piece of metal, $g$, provided with the finger $g'$ and the slot $g^2$, running somewhat outward from the base of the finger. The outer edge of the base of the finger is formed into a beveled shoulder, $g^3$, which at certain times comes into contact with a beveled point, $g^4$, fixed to the plate $f^6$ of the section $f$ of the box F, and throws the shoulder $g^5$ of the extension off the pin $f^4$ on the top of the box. Before this action takes place the said pin $f^4$ has been resting against the shoulder $g^5$ of the slot $g^2$, and had consequently been drawn forward by the rod G, the box cross-piece $f^3$ being also drawn forward at its spring-connected end and the box F sliding in the way or channel $b^4$. The trip-point $g^4$ by its action releases the pin $f^4$ and permits the box to bind in the slideway.

$g^6$ is a coiled spring connecting the piece $g$ with the side of the section $f$ and arranged to return the shoulder $g^5$ of the slot $g^2$ on the pin $f^4$, and thereby bring the shoulder $g^3$ into position to be acted on by the releasing-point $g^4$.

H, Fig. 13, is a standard rising from a base-piece, $h$, which is both longitudinally and laterally adjustable by means of a bolt passing through a slot, $h$, made in a horizontal extension, $h^2$, Figs. 1 and 2, standing from the edge of the bed-frame A to the rear of the curved portion $a'$ of the same. $h^3$ is a block pivoted on the top of said standard H, and having a horizontal opening, $h^4$, centrally through it to receive the guide-rod I of the stop $i^2$.

I, Figs. 13 and 1, is a rod passing through the said opening, and $i$ a similar but longer rod passing similarly through the opening $c^4$ of the block $c^3$, Fig. 12. Both rods may be fixed in their respective connections by proper set-screws. The rods I and $i$ have their meeting ends at the outer side of the machine made into heads, which are pivoted upon a stem, $i'$, partly bored through from the top, within which bore passes the stem of the stop $i^2$, the head of which is beveled downward and backward, as shown.

$i^3$, Fig. 13, is a coiled spring, upon which the end of the said stop-stem rests. The said stem $i'$ is slotted vertically at its upper end to allow the head of the stop to be depressed when the saw passes over it, for which purpose the head of said stop $i^2$ is beveled on top.

J, Figs. 5 and 6, Sheets 1 and 2, is a vertical standard pivoted at its lower end to the projection $b^4$ of the saw-carrier and standing from the outer side of the slideway $b^4$.

$j$, Fig. 6, is a horizontal inward projection from the standard J, above the slideway $b^4$, and upon which the edge of the saw rests.

$j'$ is a coiled spring surrounding the pin $j^2$, which stands horizontally inward from the standard J. The outer end of the spring rests against the inward projection or shoulder 2 of the standard J at its upper part, and may be bent forward and held so as to strengthen the spring by means of a pin passing through any one of the openings $j^3$.

K, Figs. 5 and 6, is a detent, having its lower end rounded backward and upward and its upper end rounded from front to rear and fitting in a horizontal groove, semicircular in section, made in the horizontal projection 2 from the top of the standard J. This detent is to hold or grip saws of different thickness on arm $j$.

$k$ is a link, pivoted by one end to the detent K, near its lower end, and having the inner end of the spring $j$ passing through an opening in the other end.

The described arrangement makes the action of the detent more easy, the said detent allowing the saw to pass forward, but preventing it returning backward. The standard J, being pivoted at its lower end, will move with the irregularities of the saw and allow the detent K to move with it also.

$k'$, Figs. 1, 2, 3, and 4, is a detent-bar sliding in a vertical recess made near the outer edge of the projection $b^4$. The upper projecting end of said bar is arranged to rise and strike against a saw-tooth within the tooth-point at the proper time. To accomplish this, the lower end of said bar rises upon an inclined plane, $k^2$, Fig. 3, of the bed-frame A, which lifts it at the proper moment.

$k^3$, Figs. 3 and 4, is a projection from the edge of the bed-frame A, having its lower surface inclined parallel to the inclined plane $k^2$. As the saw-carrier B moves forward the said inclined surface of the piece $k^3$ engages a pin, $k^4$, standing outward from the lower end of the detent-bar and draws the upper end of the latter below the level of the saw, so that it will pass the said detent or stop $k'$.

L, Figs. 16 and 19, is the base-plate forming the top of the stand and provided with the pivot $a^2$, upon which the bed-frame A may be adjusted; $a^6$, a slot in the base-plate L, made on an arc of a circle from the pivot-point $a^2$ as a center, by means of which slot and the bolt $a^5$ the bed-frame can be fixed in any desired position.

M, Fig. 19, is one of the stand-legs upon which the machine rests. A horizontal counter-shaft, $m$, has its bearings formed on two of the legs of the stand.

$m'$ is a worm-gear on said shaft, and meshes with a worm-wheel, $n$, fixed to a vertical shaft, N. N' (shown by dotted lines in Fig. 19) is a depending bracket, the upper part of which is bolted to the under surface of the base-plate. The said bracket has formed upon it the bearings of the shaft N in such manner that the said shaft stands vertically below the pivot-point $a^2$ of the bed-frame on the base-plate. The shaft N carries two or more sprocket-wheels, $n'$, which drive by a chain similar sprocket-wheels, $n^2$, fixed upon the shaft D, the said wheels being arranged for different speeds.

The bearings, Figs. 20, 21, and 22, of the counter-shaft are constructed as follows: A projection, M', stands out from near the bottom of the leg, upon which each bearing is formed, and has a vertical opening through its end. Through the opening passes the pin 6, of a swiveling bearing-bracket, $M^2$, so that the latter turns freely therein. The opposite arms of the bracket are provided with similar screw-cone points, 7, passing through them, upon which points the journal-box $M^3$ of the counter-shaft is supported and can turn vertically at right angles to the length of the shaft $m$. Thus the bearings can turn slightly both longitudinally and vertically upon the bearings 6 and 7.

O is the emery-wheel, the shaft O', Figs. 16, 17, and 18, of which has bearings $o$ $o$ in pillow-blocks rising from a three-sided rectangular frame, $o'$, that is adjustable upon the base-plate L in the following manner:

$o^2$ $o^2$ are bolts, Figs. 17 and 18, passing through the side bars of the frame $o'$ and entering slots $o^3$ $o^3$ in the base-plate below. By these bolts and nuts 8 the said frame $o'$ can be set farther forward as the emery-wheel wears off.

P P, Fig. 17, are pulleys on the shaft O' of the emery-wheel, situated over an open space in the base-plate and actuated by similar pulleys, P' P', Fig. 16, and the counter-shaft $m$, and a proper connecting-belt, the pulleys being arranged for different speeds. The counter-shaft $m$ runs below the shaft O' of the emery-wheel, so that the belt runs perpendicular from one to the other. By this means no belt-tightening device is necessary to take up the slack when the emery-wheel is moved. It is to be observed that the purpose of this adjustment is to keep the edge of the emery-wheel at all times turning through the same point, which is vertically above the pivot-point $a^2$ of the bed-frame on the base-plate, and that turning the former on the latter acts to change the pitch of the teeth.

To place the saw in proper position upon the machine, it is first fixed upon the saw-holder C, Fig. 12, by the described mechanism, so that it will move forward with the carrier, but yet be not bound rigidly thereon. When the saw is secured to the holder, the latter is moved and the rear stop, $i^2$, is moved till the back of one tooth will bear against said stop at the same time that the forward stop or detent, $k'$, rises against the front edge of the tooth next in advance, as shown in Figs. 1 and 23, while the back of each tooth in succession comes into an arc of a circle between the two stops, corresponding, or nearly so, with the curved edge $a'$ of the bed-frame and having the pivot-point $a$ of the carrier as a center. The length of stroke of the pitman is then arranged and the machine started. As the tooth next to the forward stop, $k'$, moves past the edge of the emery-wheel the latter will grind it evenly until the edge of the wheel is pressed into the throat of the tooth, where it will grind the throat and the face of the adjacent tooth, the saw in the meantime being prevented from rotating backward on the carrier by the detent K. The stroke of the pitman is arranged to allow the edge of the emery-wheel to be passed into the throat of the tooth when the pitman is just about to reach its outer dead-point. The coil-spring $e^2$ and construction of the pitman, however, allow it to extend and pass the said dead-point. In the first part of the forward or outer stroke of the pitman the trip-rod G is so arranged in relation to the eccentric-pin $d^5$ and the trip finger or point $g^4$ that the pin $f^4$ is held in the slot $g^2$ against its shoulder $g^5$ by the spring $g^6$, and the two sections of the box F are drawn together, the box consequently sliding in the slideway $b^4$; but when the shoulder $g^3$ strikes the point $g^4$ the pin $f^4$ is released from the shoulder $g^5$, and the box F binds in the slideway, and the pitman moves the saw-carrier forward. The washer or head $d^4$, that carries the eccentric-pin $d^5$, is fixed upon the crank-stem $d^3$ in proper position to effect this release at the proper time.

The action of the machine is therefore as follows: The saw being set with the rear stop, $i^2$, against the back of one tooth, and the front stop, $k'$, against the front of the tooth adjacent and forward of the former, the back of the latter tooth being in the arc of a circle of which the pivot-point $a$ of the carrier is the center, the pitman moves forward, sliding the sectional box F in the slideway $b^4$ of the carrier until the releasing-point $g^4$ throws the slotted finger part of the trip-rod G off the pin $f^4$, and then the pitman moves both the carrier and saw forward with it. The tooth between the stops is thus moved up to the emery-wheel and has its back ground evenly to the desired curve. When the emery-wheel is in the throat of the next tooth, it gently presses therein, and the extensible pitman yields and the crank passes its outer dead-point. During this time the succeeding or third tooth has passed over the rear stop, $i^2$, and gone a little distance beyond. The pitman E then returns on its backward stroke, carrying the saw and its carrier with it. The back of the third tooth first strikes against the rear stop, $i^2$, bringing the saw that was moving with the carrier to rest, but partially rotating the saw-carrier under the saw after the stop $i^2$ arrests the backward motion of the saw; but the carrier continues its motion until it brings the stop $k'$ against the face of the next forward tooth. This latter motion brings the second tooth into the arc of the circle having the pivot-point $a$ as a center. As the saw-carrier moves onward the front stop, $k'$, rises against the front edge of the second tooth, and the carrier is brought to rest, the sectional box F sliding more or less, as the space between the teeth is shorter or longer, in the slideway $b^4$, to complete the stroke of the pitman. This latter sliding motion is permitted when the sectional box moves backward, because the transverse piece $f^3$ is so inclined that the push of the pitman increases its inclination, thus tending to release the grip of the box in the slideway. The second tooth is then ground as the first was. The detent K moves backward over the saw as the latter is at rest, and holds the saw from rotating backward when drawn against the emery-wheel by the carrier.

The method of adjusting the stroke of the pitman is as follows: The saw being fixed in place, with the forward stop, $k'$, against the front edge of a tooth and the stop $i^2$ against the back of the adjacent tooth to the rear of the first, the block $d'$ is, by means of the screw $d^2$, adjusted in such manner as to bring the edge of the emery-wheel just into the throat of the second tooth when the pitman is at the end of its outward or forward stroke. The stroke is then by the same means lengthened more or less, according to the amount of force with which it is desired that the emery-wheel should press in the throat of the tooth, or, in other words, according to the amount of grinding desired. The washer $d^4$, carrying the eccentric-pin $d^5$, is so set on the stud $d^3$ as to bring the said pin in such position that it will cause the trip-rod to pass the end of its backward stroke when the pitman has arrived at the end of its backward stroke. This is to keep the sectional box from binding when the forward stroke of the pitman begins. When a tooth is short, its point will be nearer the center of the saw, and consequently its back, as the same runs from the point, will be formed on an arc of a circle lying close to the center of the saw; hence the face and throat of the tooth, when its back rests against the rear stop, will be farther from the edge of the emery-wheel, which turns through a fixed point; and as the stroke of the pitman is uniform the said tooth will not be pressed as long or as hard against the edge of the emery-wheel as the throat of a tooth of the proper size. In fact, if the tooth is very short, its face or throat may not touch the emery-wheel.

Should the tooth be long the reverse will be the case, as is evident from the foregoing, and thus the action of the machine tends to produce teeth of a uniform size. The position of the front stop, as has been explained, varies with the length of the tooth and length of spaces between the teeth. When the front stop has been moved up and risen against the front edge of a short tooth, it, and consequently the saw-carrier, will have moved farther backward than occurs when acting on a tooth of regular size, and the sectional box will have lost its grip later and have slid a less distance in the slideway during its backward stroke. Consequently, as its length of stroke is uniform, the sectional box will be farther in the slideway at the end of its forward stroke than before the short tooth had been ground. The position of the sectional box in the slideway at the ends of its stroke therefore varies with the length of the teeth and is never constant except with teeth of uniform size. When a tooth is short, the forward stop is still brought against its edge, as the sectional box will not begin to slide in the slideway $b^4$ until the said stop impinges against a tooth. The eccentric-pin $d^5$ that moves the trip-rod G is set so as to give it a forward motion before the pitman takes its forward motion. Thus the trip-rod takes hold of the pin $f^4$ by means of the shoulder $g^5$ just before the return-stroke, so that the sectional box will not bind at the commencement of the forward stroke.

The joint of rods I and $i$, in which the rear stop, $i^2$, is supported, moves about H as a center when the saw moves forward, and as the point of support of the rod $i$ must move with the carrier the joint must vary somewhat in position with every movement of the same. This movement is, however, too small to be detrimental, as the carrier moves unequally to accommodate unequal teeth in the same saw. The only motion besides its rotation that the emery-wheel has is the described adjustment to take up wear.

Referring now to Fig. 23, we will specifically describe the method by which to correct any departure in the uniformity of the teeth, and of operating upon different-sized teeth.

The saw-carrier is moved upon the fixed center $a$ by the movement of the crank formed by the shaft D and the eccentric-stem $d^3$, Fig. 7, Sheet 3, and the pitman connection; and the emery-wheel stands with its acting edge always in a fixed point at the curved end of the saw-carrier. The saw has its center at $a^7$, and is loosely clamped to a holder rigidly bolted to the saw-carrier in a manner to suit saws of different diameters, so that the points of its teeth will come against the stop $k'$, while the backs of the teeth will stand in an arc struck from the fixed center $a$. When the point of the tooth marked 4 is against the stop $k'$, the rods I $i$ are so adjusted that the stop $i^2$ will stand against the back of the tooth 5. The trip-rod G travels up and down alongside of the pitman. Bearing these points in mind, it will be seen that in the positions of the parts shown in Fig. 23 the pitman-box has its grip on the walls of the slideway and the saw is properly secured to the carrier by the conical device $c^7$ and detent K. When the crank is rotated, the saw and carrier move together about the fixed center $a$.

It is seen that the saw can be placed so that when this motion takes place the back of the tooth 4, for instance, can be ground or not, just as desired. This motion continues until the throat of the tooth 5 is against the emery-wheel. The crank is now almost at the limit of its motion in this direction, and the yielding pitman permits it to pass its center while keeping the saw-tooth gently pressed against the emery-wheel. In the meantime the detent $i^2$, by the movement of its carrying-rods, has taken up a new position, (shown by dotted lines,) not, however, changing its distance from the saw-center. The center of the saw moves in an arc of which $a$ is the center, and the rod I can only move about the fixed center H; hence the position of the detent $i^2$ is determined by these two motions. This motion of the saw-center is such that by the time the crank has carried the saw forward so that the throat of the tooth 5 is against the emery-wheel the tooth 6 will have passed over the stop $i^2$ and have gone some distance beyond.

Now, after the crank has passed its center, which is near the point 7 of its orbit, its further onward movement will tend to return the saw and its carrier—that is, move them back. This motion continues until the back of the tooth 6 strikes the stop $i^2$, and this prevents any further motion of the saw as a rigid part of its carrier, and compels the carrier during the subsequent movement to rotate about its center at the same time its center is moving along the arc 8 9 in the direction of the arrow 15. During this movement, or the first part of it at least, the detent $k'$ is depressed. The effect of this peculiar movement is to rotate the saw in the direction of the arrow 16, and tooth 6 comes where tooth 5 is and tooth 5 goes to the place of tooth 4, at least nearly so; and, moreover, this change has taken place before the crank has reached the limit in this direction. Now, take pivot $E^2$ of the pitman as a center and describe the arc 10 11, and we have a point, 12, at which the crank may be placed. Now, suppose the crank-pin to be at 12, and instead of thinking that tooth 5 is where 4 is, let us look upon tooth 4 as having just come there, and that the backward movement of the saw-carrier has brought the detent $k'$ against the tooth 4 and that the crank is at 12.

Let us now show the effect of teeth of different lengths. If teeth 4 and 5 had been farther apart, the detent $k'$ would have struck tooth 4 sooner, and the crank would have been at a point nearer 7 in the path of the crank. If, on the other hand, the distance between teeth 4 and 5 had been less, the crank would be nearer the portion $d^3$. The length of the crank is such as to always have a margin at this part of its stroke to provide for the irregularities of the teeth-spaces. Since, whenever the saw-carrier moves, the detent $i^2$ moves up and down the arc $x\,y$, referring to the bed-frame, and since the relation of the parts of the machine are such that the stop $i^2$ has its position altered only a very little by such alterations in the position of the carrier as are necessary to bring the stop $k'$ against the different teeth, we may say that when the back of one tooth is against $i^2$ and the point of the next tooth is against $k'$ the one having its back against $i^2$ will be at the same distance from the emery-wheel, whether the distance between the back and the point in question be the same for all the teeth or not. This being the case, all that is necessary to do to bring any tooth having the position described up to the emery-wheel is simply to move the carrier through the same distance every time, even though its starting and stopping points are different, according as the teeth-spaces are different. Let us now show how this same amount of movement is accomplished. We return to the condition of the crank at 12 and everything in the figure as shown. When the stop $k'$ strikes the tooth 4, the whole system is blocked and no further movement of the carrier is possible. At this point the box F is forced to move in the slideway in the direction of the arrow 13. In the meantime the trip-rod has by its crank-pin $d^5$ been carried forward also until the hook $g^5$ has engaged the pin $f^4$, and the relations of the two cranks D $d^3$ and $d^3$ $d^5$ are such that this engagement occurs before the cranks D $d^4$ begin to draw the box F forward. Not only this, but the trip-rod has even started back in the direction of the arrow 14, drawing with it the pin $f^4$ and its connected parts. The effect of this motion of the pin $f^4$ is to release the grip of the box F. All this is accomplished before the box ceases to move in the direction of the arrow 13, so that when the crank D $d^3$ in its outward movement begins to draw the box forward in the direction of the arrow 14, the box will be free to slide in the slideway, and so does not at once draw the carriage with it; but in such movement of the box there will come a time when the hook $g^5$ will be tripped off the pin $f^4$ and allow the box to resume its grip in the slideway. This tripping of the hook depends on the relation of the two cranks D $d^3$ and $d^3$ and $d^5$, and also on the positions of the shoulder $g^3$ of the trip-rod finger, and the point $g^4$; and since these are always the same for any saw, it follows that $f^4$ is always released on the arrival of the crank-pin $d^5$ at some particular point of the stroke—as, for instance, at $d^5$; hence there is always left the same part of the stroke, during which the carriage is drawn forward, and the tooth having its back against the stop $i^2$ is drawn up to the emery-wheel, and so the operation goes on. But suppose tooth 5 were defective, being shorter than the others, as shown, so that its point is already below the circumference of the other points, then to grind this tooth would make it worse. Such a tooth, by reason of its shortness, will be farther away from the emery-wheel than a normal tooth, and when it is brought forward the emery-wheel will not grind it. A tooth which projects farther out than the normal tooth, as shown, will be ground off more on its face, so as to bring it down to the circumference of the other teeth. Therefore the machine not only adapts itself automatically to the teeth of various distances apart, but it also corrects teeth that may project beyond the others. In Fig 23 this latter incident is illustrated, for it will be seen that when tooth 5 takes the place of tooth 4 the back of tooth 5 will be ground off, so that the point of tooth 5 will be in the exact circle, for the stop $k'$, striking against the face of the projecting dotted tooth, will bring the back of this tooth farther out than the line of the back of tooth 4. Consequently said tooth will be brought against the emery-wheel and ground off.

Referring to the dotted position of the detent $i^2$, (shown in Fig. 23,) it will be understood that the relation of the center of the saw with this detent is not changed during the operation of the machine, and that consequently the stop $i^2$ is always in the same circle with the saw-teeth, since the forward movement of the carrier will move the saw and the detent alike; but in this figure the corresponding dotted position of the saw is not shown.

Referring to Fig. 7, the eccentric-pin $d^5$ is placed far enough from the crank-stem $d^3$ to make the throw sufficient to equal the distance the sliding box F will move, with the greatest distance the teeth of one space is greater than the least space between two other teeth in the same saw.

We claim—

1. The combination, with the frame B, mounted upon a fixed pivot, $a$, of an adjustable holder for the saw pivoted to said frame at one side of the fixed pivot of the latter, a centering clamping device for the saw carried by said holder at one side of its pivot-connection with said frame, a friction-detent for holding the saw as each tooth is being ground, suitable stops co-operating with the saw-teeth, and suitable crank-connecting mechanism for vibrating the saw-carrying frame upon its fixed pivot to effect the intermittent rotation of the saw upon its holder, substantially as described, for the purpose specified.

2. In a circular-saw sharpener, the adjustable bed-frame A, pivoted at $b$, and the saw-carrying frame B, pivoted at $a$, in combination with a saw-holder adjustably arranged upon said frame B, at one side of its pivot $a$, as shown, an emery-wheel having its acting edge turning in a line vertically coincident with the bed-frame pivot $b$, crank-connecting mechanism for vibrating said frame B, a friction-detent for holding the saw, and suitable stops co-operating with the saw-teeth, substantially as described, for the purpose stated.

3. The combination, with a saw-carrier mounted upon a fixed pivot, and a saw-centering holder, of stops or detents, one of which has a fixed relation to the said saw-carrier and the other a variable relation thereto, and suitable operating connections with the saw-carrier having a gripping and releasing action therewith, whereby provision is made for variation in the spaces of the teeth of the saw in the operation of sharpening.

4. The combination, with the pivoted saw-carrier, a centering saw-holder, and suitable operating connections for said saw-carrier, of a friction-detent arranged to hold the saw as each tooth is being ground and permit it to be rotated, substantially as described.

5. In a circular-saw sharpener, the combination of a frame vibratable upon a fixed pivot, and a holder upon which the saw is centered with freedom for revoluble movement thereon, and having a movement with said pivoted frame, with an emery-wheel arranged to operate with its circumference in a fixed point of an arc described from the said fixed pivot and within which arc each tooth is successively brought to the operating point of said wheel.

6. The combination, with a saw-carrier mounted upon a fixed pivot, and a centering saw-holder, of stops or detents $i^2$, $k'$, and K, and suitable operating connections with said saw-carrier having a gripping, releasing, and yielding action therewith, substantially as described, for the purpose specified.

7. The combination, with a pivoted vibratable saw-carrier and an adjustable saw-centering holder carried thereby, of a stop or detent, $k'$, carried by said pivoted carrier, a fixed incline, $k^2$, arranged for elevating said detent in position to act against a tooth of the saw at the proper point in the movement of said carrier, an emery-wheel having a fixed relation to said saw-carrier, and connections for vibrating the saw-carrier, operating to draw it forward to bring the teeth in active relation to said emery-wheel with a yielding force, while the saw is prevented by a detent from turning upon its centering-holder.

8. In a circular-saw sharpener, the vibratable saw-carrying frame mounted upon a fixed pivot and having a slot extending along one side of said pivot, in combination with a saw-holder having an adjustable connection with said frame in said slot, and a centering device for the saw standing to that side of said slot farthest from said pivot, having a loosely-clamping action upon said saw, whereby the saw has a movement with its carrying-frame in the arc of a circle described from said pivot, and is free to be rotated upon its centering-holder to bring each tooth into the arc of which said fixed pivot is the center, substantially as described, for the purpose specified.

9. In a circular-saw sharpener, the combination, with a pivoted saw-carrier, of a bed-frame, A, provided with the opening $a^2$, arranged below and in vertical line with the acting edge of the emery-wheel, the set-screw $a^5$, and the base frame L, having the pivot-pin $b$, and having the slot $a^6$, through which the set-screw $a^5$ passes, substantially as described, for the purpose specified.

10. In a circular-saw sharpener, the combination of a saw-carrier pivoted and vibrated upon a fixed bed-frame and arranged to support and move the saw-teeth successively in the arc of a circle of which its pivot forms the center, with an emery-wheel holding a fixed relation to the bed-frame, and having its edge turning in a fixed point of the above arc, and pitman-connections constructed and arranged to vibrate the carrier, substantially as specified, for the purpose stated.

11. In a circular-saw sharpener, a saw-carrier pivoted and vibrated upon a fixed bed-frame, and an adjustable saw-holder constructed to permit the saw to be turned on its center, in combination with an adjustable stop or detent arranged to act against the back of each tooth successively as the saw moves forward, a stop or detent moving with the carrier and arranged to act against the front of the next succeeding tooth successively, and suitable mechanism to move the carrier and the saw, substantially as specified, for the purpose stated.

12. In a circular-saw sharpener, the combination of the bed-frame A, a pivoted carrier, B, a saw-holder, C, upon which the saw is free to be turned, with adjustable jointed connections, a detent or stop, $i^2$, carried by such connections, a detent or stop, $k'$, carried by the pivoted saw-carrier, an emery-wheel, O, and mechanism adapted to vibrate the carrier, substantially as described, for the purpose specified.

13. In a circular-saw sharpener, the combination, with a bed-frame, a pivoted vibrating saw-carrier, and a saw-holder, of a pivoted standard, J, and a detent carried thereby having a yielding pressure upon the saw, substantially as specified, for the purpose stated.

14. In a circular-saw sharpener, the combination, with the pivoted saw-carrier having a slot, $b^3$, of a saw-holder consisting of an adjustable base, a saw-seat, $c^6$, a conical hub, $c^7$, a screw-stem, $a^7$, a washer, $c^8$, splined on said stem, and a nut, $a^7$, substantially as specified.

15. In a circular-saw sharpener, the combination, with the bed-frame, a pivoted vibrating saw-carrier, and an adjustable saw-holder, of adjustable jointed rods I and $i$, and detents or stops $i^2$ and $k'$ K, substantially as specified.

16. In a circular-saw sharpener, the combination, with the bed-frame, the saw-carrier B, and saw-holder, of the block $c^3$, turning freely on the stem of the saw-holder, the adjustable standard H, the swiveling block $h^3$, carried by said standard, the adjustable rods I and $i$, and the spring sustained detent or stop $i^2$, substantially as specified.

17. In a circular-saw sharpener, the combination, with the bed-frame and pivoted saw-carrier provided with the slideway $b^4$, of the head $d$, its carrying-shaft D, the adjustable block $d'$, provided with the crank-pin $d^3$, the pitman E, and a clamping and releasing box device, F, operating within said slideway $b^4$, substantially as described.

18. In a circular-saw sharpener, the combination, with the pivoted carrier B and an extensible pitman, E, of a trip-rod, G, provided with the slot $g^2$ and shouldered finger $g'$, the eccentric-pins $d^5$ $d^3$, and shaft D, the clamp-box F, composed of the sections $f$ and $f'$, the pivoted cross-arm $f^3$, the spring $f^5$, pin $f^4$, and the releasing finger or point $g^4$, substantially as specified.

19. The combination, with a vibratable saw-carrying frame mounted upon a fixed pivot, a saw-centering holder arranged thereon eccentric to said pivot, and detents arranged to operate upon the teeth of the saw, of a pitman and crank operating connection having a yielding function, a friction gripping and releasing device connecting said pitman with said saw-carrying frame, and a suitable tripping device operating to control the friction gripping and releasing device by suitable connection with the pitman-crank, substantially as described, for the purpose specified.

20. The combination, with the pivoted saw-carrying frame B, the centering saw-holder, the detents $k'$ and $i^2$, arranged to operate upon the teeth of the saw, and an emery-wheel, of the crank-pins $d^3\,d^5$, the friction gripping and releasing device F, operating in the said carrying-frame, suitable yielding and tripping connections uniting the said crank-pins with the said friction gripping and releasing device, and an adjustable connection of said crank-pins with the operating shaft, substantially as described, for the purpose specified.

21. For sharpening circular saws, the following elements in combination, viz: a pivoted vibratable saw-carrying frame, a centering saw-holder adjustable thereon, a detent, $k'$, operated by a fixed incline to arrest the forward movement of the saw upon its axis, a spring-sustained detent, $i^2$, acting to rotate the saw upon its axis in a forward direction against the said first-named detent, both detents being arranged to operate within the path of the saw-teeth, each upon adjacent teeth, an emery-wheel, and suitable connections for vibrating the said saw-carrying frame during the advancing movement, of which the said detents act to hold the saw while a tooth is being ground.

22. The combination, with a saw-carrier mounted upon a fixed pivot and a centering saw-holder, of stops or detents $i^2$, $k'$, and K, and means for connecting said saw-carrier with the operating-shaft, whereby the saw-carrier operates to bring each tooth back successively to the arc to be acted upon, substantially as herein set forth.

23. The combination, with the emery-wheel, of the pivoted saw-carrier B, the saw-support mounted thereon, mechanism for vibrating said saw-carrier, a vertically-operating stop, $k'$, a vertically-yielding stop, $i^2$, and a friction-detent for holding the saw, substantially as described, for the purpose stated.

24. In a circular-saw sharpener, the combination of a pivoted carrying-frame for the saw, an adjustable support for the latter mounted upon said frame, the stop $k'$, carried by the said frame, means for operating it vertically, the spring-sustained stop $i^2$, and a friction-detent for holding the saw, as described, with mechanism connecting and vibrating said frame having a yielding, a clamping, and a tripping connection therewith, substantially as described, for the purpose specified.

In testimony whereof we have hereunto set our hands.

NEWELL P. MIX.
CHARLES FREDERICK MARVIN.

Witnesses to the signature of Newell P. Mix:
GEORGE COIT,
LORENZO ENGLISH.

Witnesses to the signature of Charles Frederick Marvin:
A. E. H. JOHNSON,
J. W. HAMILTON JOHNSON.